United States Patent
Meiners et al.

(10) Patent No.: US 6,786,749 B2
(45) Date of Patent: Sep. 7, 2004

(54) UNIVERSAL CONNECTOR FOR SECURING BUS BARS TO ELECTRICAL EQUIPMENT

(75) Inventors: Steven E. Meiners, Greenwood, SC (US); Arthur J. Jur, Greenwood, SC (US); Douglas M. Brandt, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 22 days.

(21) Appl. No.: 10/289,012

(22) Filed: Nov. 6, 2002

(65) Prior Publication Data

US 2004/0087221 A1 May 6, 2004

(51) Int. Cl.⁷ ................................................. H01R 4/30
(52) U.S. Cl. ..................................... 439/213; 174/71 B
(58) Field of Search .......................... 439/213; 361/637, 361/638, 639, 549, 611, 649; 174/71 B, 88 B

(56) References Cited

U.S. PATENT DOCUMENTS

| 5,011,421 | A | * | 4/1991 | Duke et al. ................. 439/213 |
| 5,530,205 | A | | 6/1996 | Parks et al. |
| 6,018,455 | A | | 1/2000 | Wilkie, II et al. |
| 6,040,976 | A | | 3/2000 | Bruner et al. |
| 6,141,206 | A | | 10/2000 | Bruner et al. |
| 6,205,017 | B1 | | 3/2001 | Wilkie, II et al. |
| 6,381,122 | B2 | | 4/2002 | Wagener |

* cited by examiner

Primary Examiner—Neil Abrams
Assistant Examiner—Phuong Dinh
(74) Attorney, Agent, or Firm—Martin J. Moran

(57) ABSTRACT

An electrical connector may be utilized to connect bus bars having a wide variety of configurations to a wide variety of electrical equipment, without modification to the bus bars, electrical equipment, or connector, with the exception of cutting the electrical connector to a desired length.

18 Claims, 4 Drawing Sheets

UNIVERSAL CONNECTOR FOR SECURING BUS BARS TO ELECTRICAL EQUIPMENT

BACKGROUND OF THE INVENTION

1. Field of the Invention

The present invention relates to electrical connectors. More specifically, the invention provides a connector configured to provide an electrical connection between a bus system and electrical equipment drawing power from the bus system.

2. Description of the Related Art

Single phase and three phase electrical bus systems are commonly used to carry current between the source and its load, with various components of electrical equipment located along the current path for controlling the flow of current. Connecting the bus bars to various electrical equipment presently requires offsetting and bending of the bus bars, which must be done in a different manner for each piece of equipment.

One example of a presently available apparatus for securing bus bars to switches is described in U.S. Pat. No. 5,530,205, issued to D. A. Parks et al. The apparatus includes a mounting block defining a plurality of bus bar receiving apertures. Each aperture includes a cylindrical section and a cross shaped section, dimensioned and configured to support a rectangular bus bar oriented with its width either substantially horizontal or substantially vertical. The end of each bus bar includes a cylindrical locking device, having a snap ring within a circumferential groove. The center of the locking device includes a longitudinal threaded bore, for receiving a tapered actuating member. A pair of actuating pins extend radially outward within the locking device, between the actuator and the snap ring. Once the bus bar is inserted within the mounting block, turning the actuator causes the tapered portion of the actuator to cam the actuator pins outward, expanding the snap ring against the surface of the cylindrical portion of the hole within the mounting block, thereby securing the bus bar in place.

U.S. Pat. No. 6,018,455, issued to W. E. Wilkie, II et al. on Jan. 25, 2000, describes a heat sink for electrical conductors.

U.S. Pat. No. 6,040,976, issued to R. W. Bruner et al. on Mar. 21, 2000, describes a switchgear conductor and a mounting arrangement for the conductor. The conductor includes a pair of U-shaped channels, with the open side of the U-shaped channels facing each other, thereby concentrating conductive material at the periphery of the conductor, and permitting circulation of air for cooling. A pair of flat stab conductors is secured to each pair of U-shaped conductors, extending to a point where they join together so that they may engage a quick disconnect.

Accordingly, it is desirable to provide an electrical connection between a bus system and its associated electronic equipment, capable of being used to electrically connect a wide variety of bus systems to a wide variety of electrical equipment. Further, it is desirable to reduce the number of connectors that must be purchased and stored in order to connect a wide variety of buses to a wide variety of electrical equipment.

SUMMARY OF THE INVENTION

The present invention provides a connector for connecting a wide variety of bus bars to a wide variety of electrical equipment.

The connector is an elongated member, made from an electrically conductive material such as copper. The connector includes means for connecting to electrical equipment, means for connecting to bus bars of different thicknesses, and may also include means for providing cooling. One preferred method of manufacture is extrusion.

A preferred means for connecting to the terminals of various electrical equipment is a pair of flanges, defining a channel therebetween for receiving a mating terminal of the electrical equipment. These first flanges may also define a plurality of holes, thereby permitting a bolt to pass through these holes, and corresponding holes within the mating terminal of the electrical equipment, for securing the terminal to its mating contact.

A preferred means for connecting to bus bars of various thicknesses includes a plurality of lengthwise flanges, for example, three flanges, defining bus bar receiving channels therebetween. In some preferred embodiments, these flanges may be substantially perpendicular to the first flanges. The second flanges preferably define channels having a greater width near their open edge, and a reduced width near their closed edge. A wide bus bar may thereby be inserted into the wider portion of the channel, and a narrow bus bar may be inserted farther into the channel, so that it enters the narrow portion, with the spacer used within the channel's wider portion. The second flanges may also define a plurality of bolt-receiving holes for securing the connector to the bus bars.

A preferred means for cooling the connector include a plurality of lengthwise flanges, dimensioned and configured to increase the surface area of the connector, thereby permitting more rapid heat transfer between the connector and the surrounding air.

BRIEF DESCRIPTION OF THE DRAWINGS

Like reference numbers denote like elements throughout the drawings.

DETAILED DESCRIPTION

The present invention provides an electrical connector for connecting a wide variety of bus assemblies to a wide variety of electrical equipment.

Figure 1:
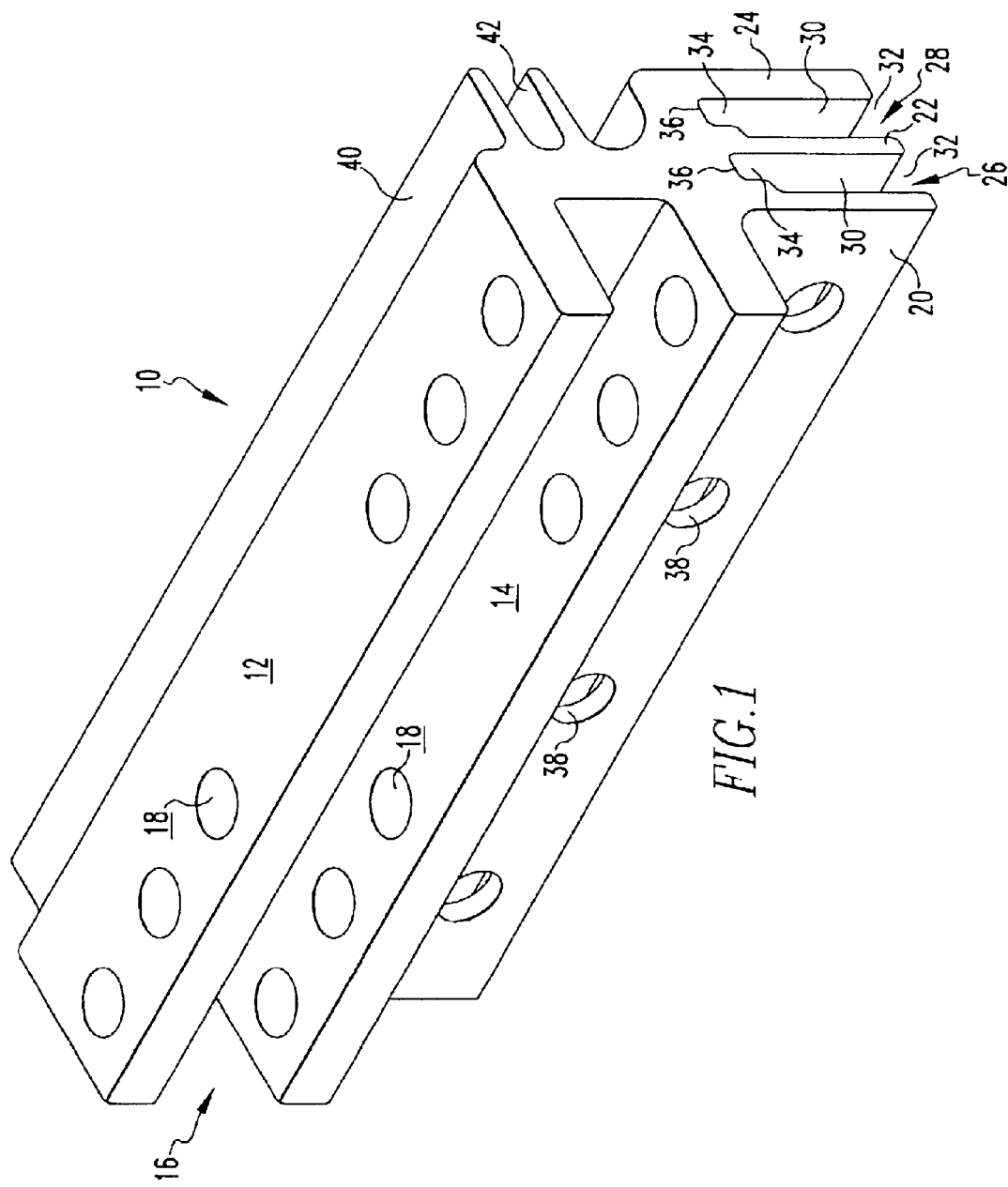
FIG. 1 is an isometric view of a connector according to the present invention.
Figure 2:
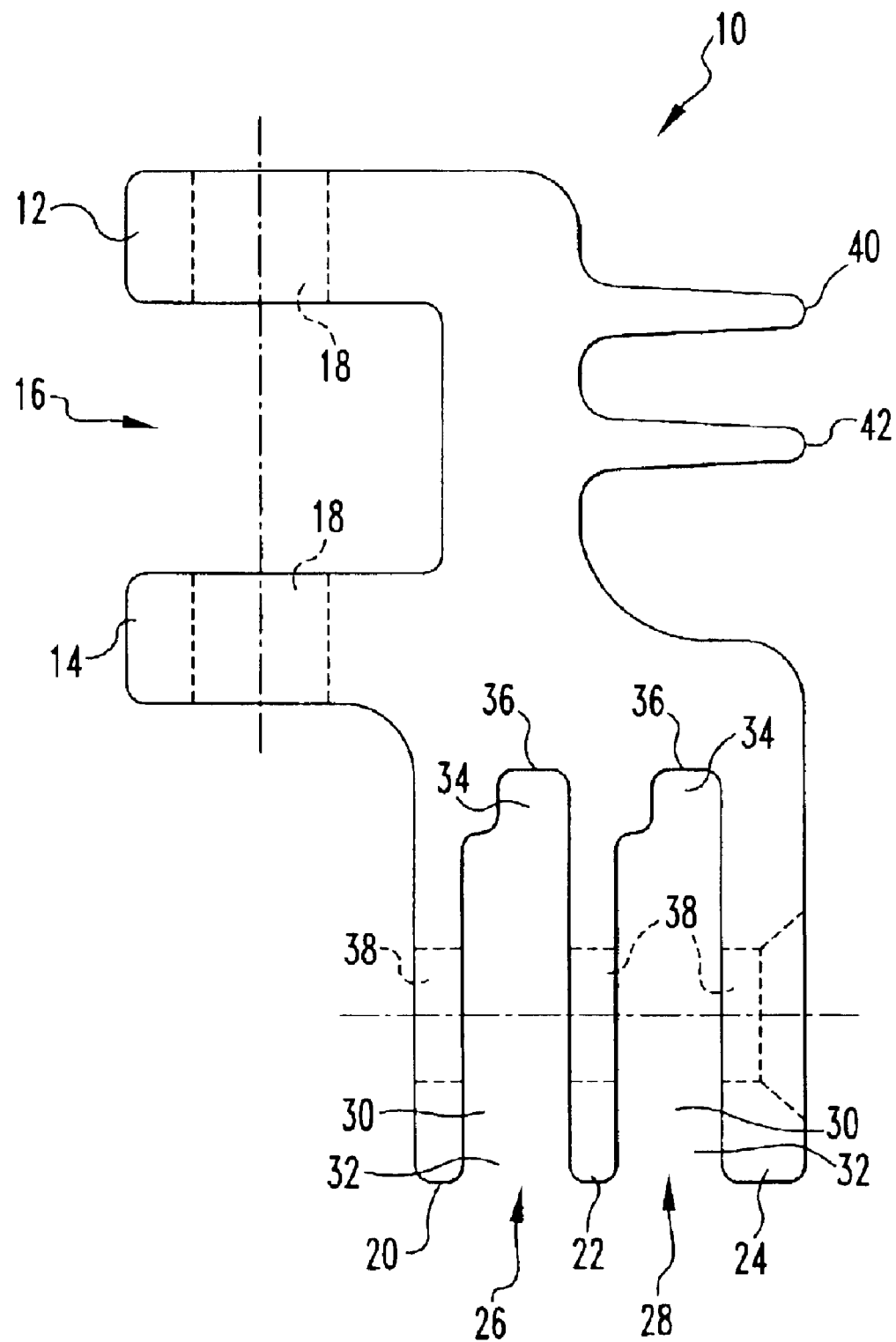
FIG. 2 is an end view of a connector according to the present invention.

Referring to FIGS. 1 and 2, the electrical connector 10 is an elongated member having means for connecting to an electrical terminal of an item of electrical equipment, for example, a circuit breaker, and means for connecting to a bus system.

Preferred means for connecting to an electrical contact of electrical equipment include a pair of lengthwise flanges 12, 14, defining a channel 16 therebetween. The channel 16 is dimensioned and configured to receive a mating terminal on a piece of electrical equipment. The flanges 12, 14 each preferably define a plurality of apertures 18, dimensioned and configured to receive a bolt.

A preferred means for connecting to a bus system include a plurality of flanges, for example, three flanges, 20, 22, 24.

The flanges 20, 22, 24 define channels 26, 28 therebetween, dimensioned and configured to receive bus bars of varying thicknesses. The channels 26, 28 preferably each define a wide portion 30 adjacent to their open edge 32, and a narrow portion 34 adjacent to their closed edge 36. The flanges 20, 22, 24 preferably also define apertures 38, dimensioned and configured to receive a bolt. In many preferred embodiments, the flanges 20, 22, 24 will be substantially perpendicular to the flanges 12, 14.

The connector 10 may also include means for dissipating heat, for example, a plurality of flanges 40, 42, dimensioned and configured to increase the surface area of the connector 10. Although two flanges 40, 42 are illustrated, any number may be used. By increasing the surface area of the electrical connector 10, the flanges 40, 42 cause an increased rate of heat dissipation.

The connector 10 may be made from any electrically conductive material that is also easily cut to a desired size, with one example being copper. A preferred method of making a connector 10 is by extrusion.

Figure 3:
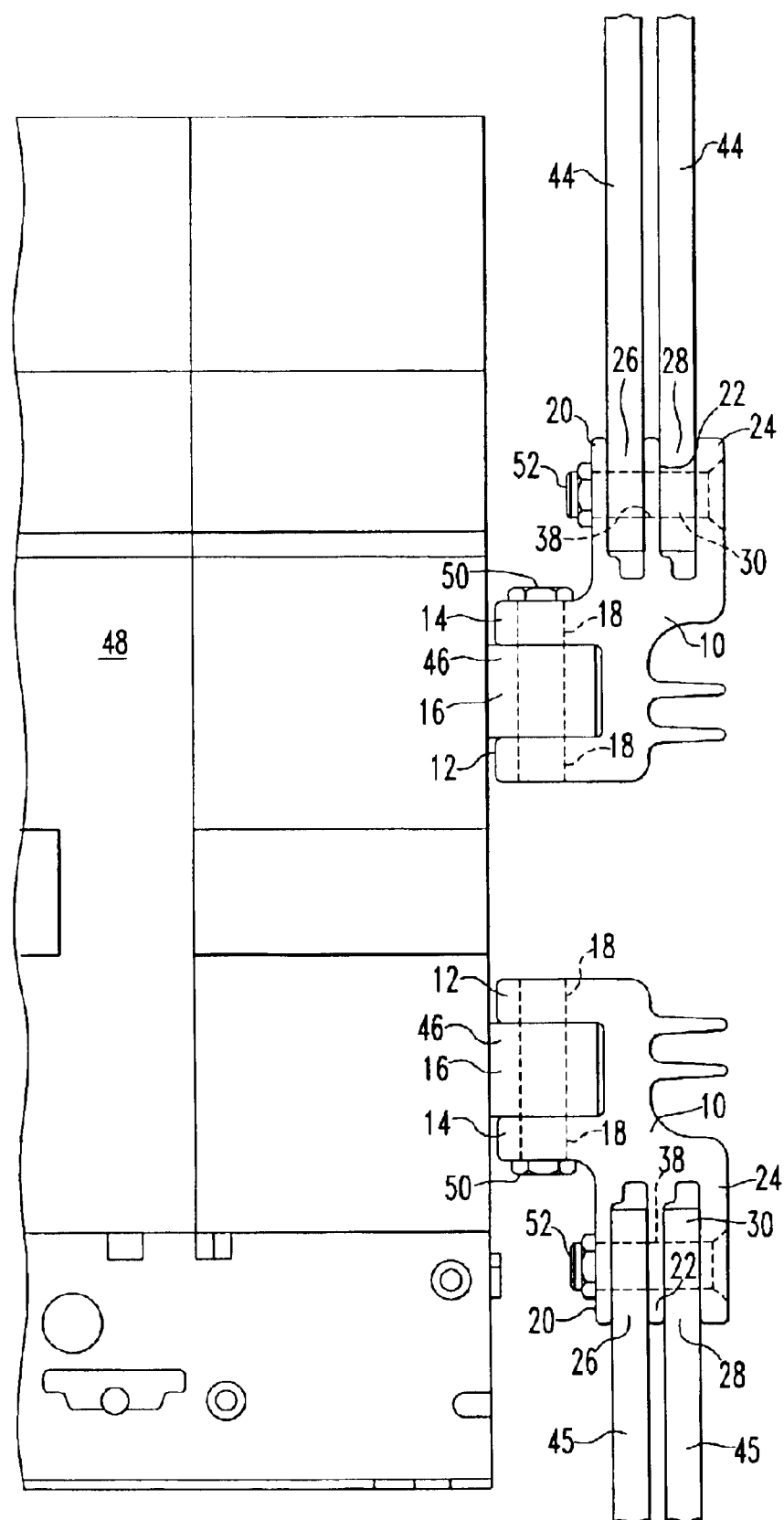
FIG. 3 is a side view of a pair of connectors according to the present invention, used in conjunction with bus bars having a first thickness, and electrical equipment.

Referring to FIG. 3, a connector 10 is illustrated forming an electrical connection between bus bars 44 and a terminal for an electrical component, which in the illustrated example is a stab extension 46 of a circuit breaker 48. It is well known in the art of circuit breakers to provide for disconnection of a circuit breaker prior to opening its cabinet and servicing the breaker by moving the circuit breaker from its rearward, operating position within the cabinet to a forward, disconnected position. At least one pair of quick disconnects on the rear of the circuit breaker will be electrically coupled with a pair of corresponding stabs within the breaker cabinet when the circuit breaker is in its rearward position, thereby providing for current flow through the circuit breaker. Moving the circuit breaker forward within the cabinet disconnects the quick disconnects from the stabs, thereby preventing current flow through the circuit breaker. In a typical three-phase system, three pairs of quick disconnects and three pairs of corresponding stabs will be provided. It is therefore necessary to provide for electrical connection between one stab within each pair and the bus bars leading to the power supply, and also to provide electrical connection between the other of each pair of stabs and the bus bars leading to the load protected by the circuit breaker.

Each stab extension 46 fits within a channel 16 defined within a connector 10. The stab extension 46 and connector 10 are secured together by a bolt 50 passing through the apertures 18 defined within the flanges 12 and 14, and through corresponding apertures within the stab extension 46. Likewise, line bus bars 44 and load bus bars 45 are secured within the channels 26, 28 of the connector 10, with a bolt 52 passing through the apertures 38 defined within the flanges 20, 22, 24, and corresponding apertures within the line and load bus bars 44, 45. The line bus bars 44 and load bus bars 45 illustrated in FIGS. 3 and 4 are relatively wide, and therefore fit only within the wide portion 30 of the channels 26, 28.

Figure 4:
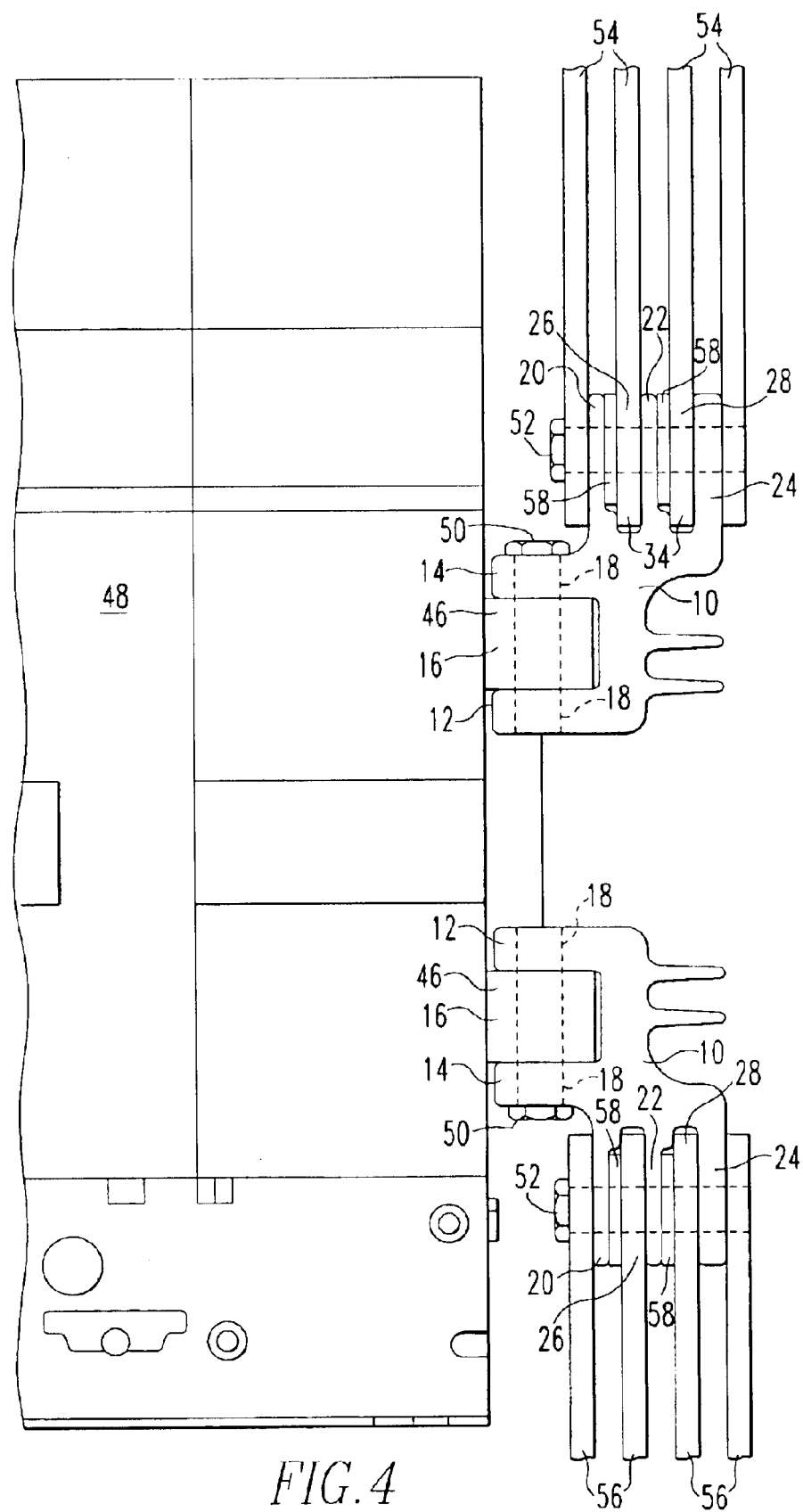
FIG. 4 is a side view of a pair of connectors, a set of bus bars having a second thickness, and associated electrical equipment.

Referring to FIG. 4, the connectors 10 are used to connect another set of line bus bars 54 and load bus bars 56 to the stab extensions 46 of a circuit breaker 48. The illustrated bus bars 54, 56 are narrower than the bus bars 44, 45, and therefore extend into the narrow portions 34 of the channels 26, 28. Spacers 58 may be inserted into the wide portions 30 of the channels 28, so that the bus bars 54, 56 and spacers 58 take up the entire channels 26, 28, maximizing the cross-sectional area available or current flow.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical connector for use between a bus bar system and electrical equipment, the electrical equipment having at least one pair of terminals, the bus bar system having a plurality of bus bars having a thickness, said electrical connector having a unitary, elongated structure comprising:

a pair of first lengthwise flanges defining a first channel therebetween, said first channel being dimensioned and configured to receive one of said pair of terminals; and a plurality of second lengthwise flanges defining second channels therebetween, each of said second channels having an open edge and a closed edge, each of said second channels being dimensioned and configured to receive a bus bar, said second channels each having a first width adjacent to said open edge, and a second width adjacent to said closed edge, said first width being greater than said second width.

2. The electrical connector according to claim 1, wherein said first pair of lengthwise flanges define at least one pair of corresponding apertures, with one of said pair of corresponding apertures being defined within each of said flanges, said apertures further being substantially coaxial, said pair of apertures being dimensioned and configured to receive a bolt therethrough.

3. The electrical connector according to claim 1, wherein said second flanges are substantially perpendicular to said first flanges.

4. The electrical connector according to claim 1, wherein said second lengthwise flanges are three in number.

5. The electrical connector according to claim 1, wherein said second lengthwise flanges define corresponding apertures, with one of said corresponding apertures being defined within each of said flanges, said apertures further being substantially coaxial, said apertures being dimensioned and configured to receive a bolt therethrough.

6. The electrical connector according to claim 1, further comprising means for increasing a surface area for improved dissipation of heat.

7. The electrical connector according to claim 1, wherein said means for increasing surface area include at least one third lengthwise flange.

8. The electrical connector according to claim 1, wherein said connector is made from an electrically conductive, easily-cut material.

9. The electrical connector according to claim 8, wherein said material is copper.

10. A circuit breaker, comprising:

at least one pair of terminals;

a bus bar system having a plurality of bus bars having a thickness;

an electrical connector having a unitary, elongated structure, comprising:

a pair of first lengthwise flanges defining a first channel therebetween, said first channel being dimensioned and configured to receive one of said pair of terminals; and a plurality of second lengthwise flanges defining second channels therebetween, each of said second channels having an open edge and a closed edge, each of said second channels being dimensioned and configured to receive a bus bar, said second channels each having a first width adjacent to said open edge, and a second width adjacent to said closed edge, said first width being greater than said second width.

11. The circuit breaker according to claim 10, wherein said first pair of lengthwise flanges define at least one pair of corresponding apertures, with one of said pair of corresponding apertures being defined within each of said flanges, said apertures further being substantially coaxial, said pair of apertures being dimensioned and configured to receive a bolt therethrough.

12. The circuit breaker according to claim 10, wherein said second flanges are substantially perpendicular to said first flanges.

13. The circuit breaker according to claim 10, wherein said second lengthwise flanges are three in number.

14. The circuit breaker according to claim 10, wherein said second lengthwise flanges define corresponding apertures, with one of said corresponding apertures being defined within each of said flanges, said apertures further being substantially coaxial, said apertures being dimensioned and configured to receive a bolt therethrough.

15. The circuit breaker according to claim 10, further comprising means for increasing a surface area for improved dissipation of heat.

16. The circuit breaker according to claim 15, wherein said means for increasing surface area include at least one third lengthwise flange.

17. The circuit breaker according to claim 10, wherein said connector is made from an electrically conductive, easily-cut material.

18. The circuit breaker according to claim 17, wherein said material is copper.

* * * * *